Oct. 29, 1929.　　　F. T. ROOT　　　1,733,363
SPARE TIRE CARRIER
Filed July 13, 1927　　2 Sheets-Sheet 2
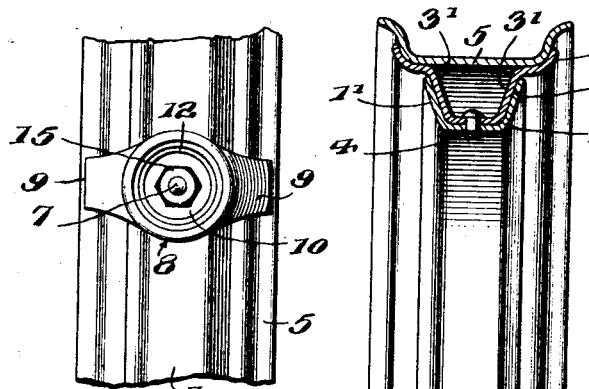
INVENTOR.
Frank T. Root,
BY
ATTORNEY.

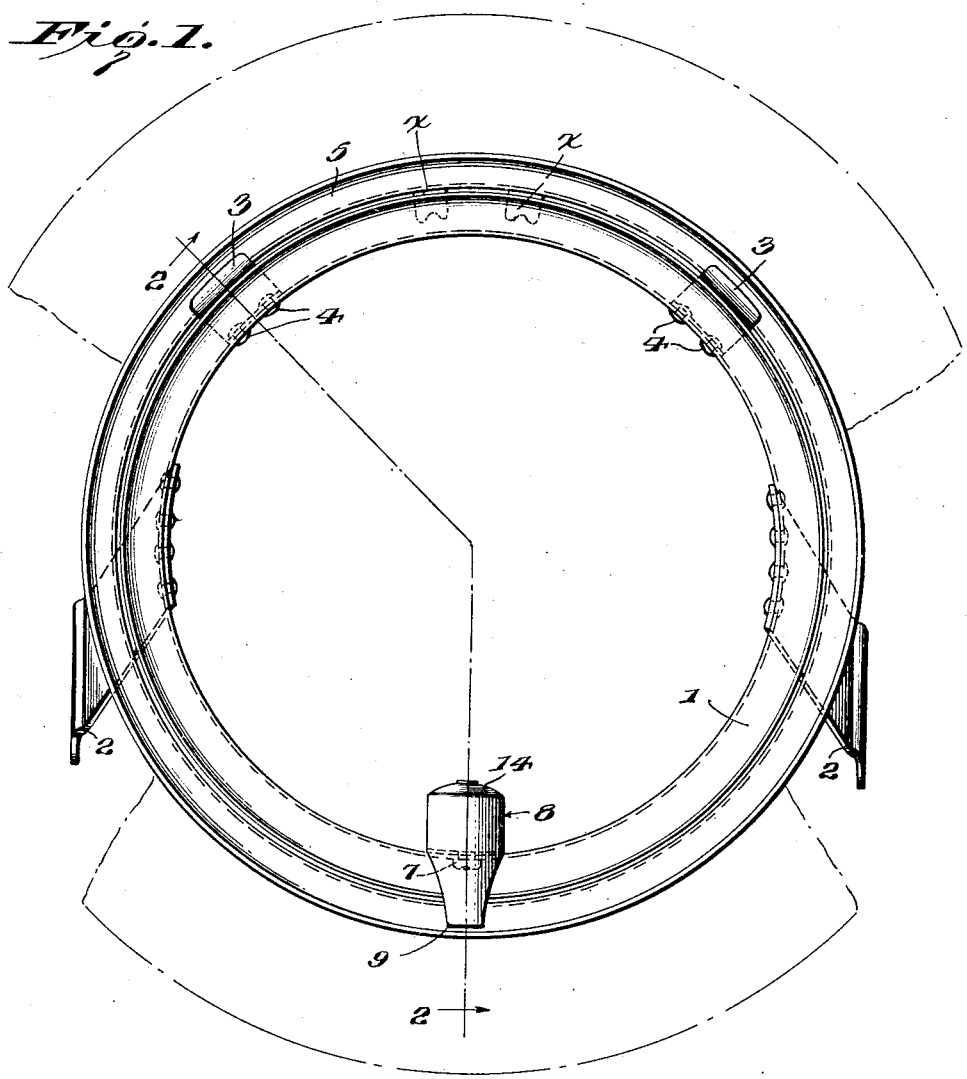

Patented Oct. 29, 1929

1,733,363

UNITED STATES PATENT OFFICE

FRANK T. ROOT, OF YORK, PENNSYLVANIA, ASSIGNOR, BY MESNE ASSIGNMENTS, TO DETROIT AND SECURITY TRUST COMPANY, A CORPORATION OF MICHIGAN

SPARE-TIRE CARRIER

Application filed July 13, 1927. Serial No. 205,482.

This invention relates to improvements in tire carriers of the type adapted to prevent surreptitious removal of the spare tire and rim.

It is an object of the invention to provide a tire carrier upon which a spare tire and its rim may be readily placed and locked in position, yet at the same time removed by an authorized person with equal ease.

The invention more specifically relates to an improved rim locking clamp used in connection with the tire carrier.

Another very important feature of the invention is to provide a ring of channel formation comprising a base and upstanding, outwardly diverging, flanges defining a circumferential recess to receive lugs or other extensions provided by the conventional types of demountable rims, thus obviating the expense of cutting holes in the ring to receive such lugs or projections with the consequent weakening of the rims (which are made as cheaply as possible), and the distortion of the ring incident thereto when subjected to the strain of practical usage in the removal and mounting of the rims upon the ring.

The channel shape formation of the ring greatly strengthens the same and co-operates with the locking device to prevent unauthorized removal of the spare rim and tire in a lateral direction. Other advantages of the channel-shaped formation of the ring will be apparent from the following specification.

In the drawing Fig. 1 discloses a view looking at the rear of the tire carrier;

Fig. 2 is a view of the ring partly in section disclosing the channel-shaped formation of the ring and the location of the rim seat as well as the sectional view through the rim locking clamp;

Fig. 3 is a top view of the rim locking clamp without the locking closure;

Fig. 4 is a detail view of the locking closure which may be employed.

Referring now more particularly to the drawings wherein like reference characters indicate corresponding parts, the numeral 1 designates a tire supporting or carrying ring of substantially circular formation and constructed of metal of U-shaped formation. This ring is connected with suitable supports 2 by means of which the ring is supported from the chassis of a vehicle. At the upper portion thereof the ring carries a pair of rim seats 3 each being riveted to the ring by rivets 4. These seats are of a metallic construction and of a contour corresponding to the contour of the under side of the demountable rim 5. It will be observed that the flanges 1' diverge outwardly and that the rim seats 3 have portions 3' correspondingly shaped and adapted to fit snugly within the confines of the channel ring and are located centrally with respect to the supported rim so that equal stresses and strains are imposed upon the adjacent rim seating portions 3 which engage the beads of the rim to resist lateral movement thereof. These rim seats are disposed in the upper half of the circumference of the ring as disclosed in Fig. 1. The conventional types of demountable rims have depending lugs or extensions to prevent creeping when in use on the automobile wheel and such extensions are diagrammatically shown in Fig. 1 and designated by reference characters $x$ and fit within the confines of the channel shaped ring without the necessity of perforating the ring and serve a useful purpose in this association in that they are capable of co-operating with the side flanges 1' of the supporting ring to resist lateral removability of the demountable rim and tire.

At the lower end of the ring 1 an aperture 6 passes therethrough. This aperture 6 is adapted to receive a threaded bolt 7. The function of the threaded bolt is to secure the rim locking clamp 8 against the upper surface of the positioned rim 5. The rim locking clamp has suitable rim engaging sides 9 fitting against each side of the rim 5 at the ends thereof while an intermediate partition 10 is provided having an extension 11 registering with the aperture 6 in the rim 1. The sides of the rim locking clamp extend substantially above this partition and are formed with suitable flanges 12 which engage the under side of detents 13 to hold the locking device 14 in position. It will be appreciated that when a rim is placed on the carrier it seats upon the spaced rim seats 3 and the rim clamping device 8 is then clamped down upon the lower portion of the rim as shown in Fig. 2. This is accomplished by tightening the nut 15 on the bolt 7 which draws the rim locking clamp downwardly until it has a locking engagement with the rim.

After this has been accomplished the locking device 14 is slipped over the open end of the rim locking clamp and the detents 13 by reason of their bevelled underfaces ride over the flanges 12 and are then urged out by suitable springs whereby the locking device 14 is locked into position. To remove the locking device 14 and to gain access to the nut 15 of the screw or bolt 7 the locking key is inserted which draws the detents 13 into the housing of the locking mechanism whereby this locking device can be removed as a unit from the open end of the rim locking clamp and a spare tire and rim removed or a tire and rim placed upon the carrier.

It will be apparent that when the locking assembly is in its position described, no unauthorized person can remove a tire from the carrier because it is impossible to remove the rim locking clamp 8 from its locking position until the nut 11 and the bolt are engaged.

As will be apparent from the foregoing the channel shaped ring constitutes an important characteristic of my invention as it provides an annular recess or space between the flanges thereof serving to receive the depending lugs or extensions found on the conventional types of demountable rims. Such lugs enter the space when the demountable rim is placed on the carrier thereby eliminating the necessity of perforating the rim on the base which is an expensive operation and one which serves to materially weaken the carrier ring as no ring is stronger than its weakest point. The channel shaped formation of the ring lends great strength and rigidity thereto, serving to render most difficult distortion due to rough usage or due to unauthorized tampering. The rim seats co-operating with the channel shaped ring and centrally located with respect thereto prevent any lateral displacement by an unauthorized person.

What I claim is:

A spare tire carrier comprising an annular ring of a circumference slightly smaller than the demountable rims supported thereon, said ring having a base and outwardly diverging side flanges of substantially unbroken character integral therewith and providing a space between said flanges, rim seating devices of channel-shaped formation within the confines of the channel-shaped ring, said rim seating devices having portions of complemental shape to tightly fit and directly bear upon the inner wall of the base and the inner walls of the flanges and provided with horizontally bent rim portions and upturned fingers shaped to conform with the bead of the demountable rim supported thereon.

In testimony whereof I affix my signature.

FRANK T. ROOT.